United States Patent [19]
Riviello et al.

[11] Patent Number: 5,865,994
[45] Date of Patent: Feb. 2, 1999

[54] BIFUNCTIONAL CROWN ETHER-BASED CATION-EXCHANGE STATIONARY PHASE FOR LIQUID CHROMATOGRAPHY

[75] Inventors: John Riviello, Santa Cruz; Maria Rey, San Jose; Jacek Jagodzinski, Redwood City; Christopher Pohl, Union City, all of Calif.

[73] Assignee: Dionex Corporation, Sunnyvale, Calif.

[21] Appl. No.: 816,878

[22] Filed: Mar. 13, 1997

[51] Int. Cl.$^6$ .................................................. B01D 15/08
[52] U.S. Cl. ................................... 210/198.2; 210/502.1; 210/635; 210/656; 502/402
[58] Field of Search ..................... 210/635, 656, 210/198.2, 502.1; 428/403, 407, 401; 502/402

[56] References Cited

U.S. PATENT DOCUMENTS

| | | | |
|---|---|---|---|
| 3,915,642 | 10/1975 | Small et al. | 23/230 R |
| 3,918,906 | 11/1975 | Small et al. | 23/230 R |
| 3,925,019 | 12/1975 | Small et al. | 23/230 R |
| 4,351,909 | 9/1982 | Stevens | 521/28 |
| 4,382,124 | 5/1983 | Meitzner et al. | 521/38 |
| 4,383,047 | 5/1983 | Stevens et al. | 521/20 |
| 4,842,935 | 6/1989 | Shinbo | 210/198.2 |
| 5,110,474 | 5/1992 | Horwitz | 210/198.2 |
| 5,324,752 | 6/1994 | Barretto et al. | 521/28 |
| 5,346,618 | 9/1994 | Horwitz | 210/198.2 |
| 5,356,538 | 10/1994 | Wai | 210/634 |
| 5,503,933 | 4/1996 | Afeyan et al. | 428/407 |
| 5,730,874 | 3/1998 | Wai | 210/638 |

OTHER PUBLICATIONS

Cai–Ying Wu, et al. "Preparation and Characteristics of a Crown Ether Polysilozane Stationary Phase for Capillary Gas Chromatography", *Anal. Chem.*, 62:968–971 (1990).

Manecke, Georg, et al. "Uber polymere Koronanden auf der Basis von 18–Krone–6 enthaltenden Vinylmonomeren", *Makromol. Chem.*, 182: 3017–3030 (1981).

Ikeda, I., et al. "Synthesis of Substituted Crown Ethers from Oligoethylene Glycols", *J. Org. Chem.*, 45: 5355–5358 (1980).

McDaniel, C.W., et al. "Preparation of Crown Compounds Containing Allyloxymethyl or Butenyl Groups for Attachment to Silica Gel or Containing Long Chain Lipophilic Groups for Use in Liquid Membrane Systems", *J. Heterocycl. Chem.*, 26:413 (1989).

Laubli, M.W., et al. "Selectivity enhancement on a poly(butadiene–maleic acid)–coated cation phase induced by ethylene oxide–based complexing agents", *Journal of Chromatography A*, 706:103–107 (1995).

Blasius, E., et al., "Application of exchangers with crown ethers as anchor groups in analytical and preparative chemistry", *Journal of Chromatography*, 167:307–320 (1978).

Delphin, W.H., et al. "Effects of Crown Ethers on Ion Exchange behavior af Alkali Metals", *Analytical Chemistry*, Bol. 50(7):843–848 (1978).

(List continued on next page.)

*Primary Examiner*—Ernest G. Therkorn
*Attorney, Agent, or Firm*—David J. Brezner; Mark T. Kresnak; Flehr Hohbach Test Albritton and Herbert LLP

[57] ABSTRACT

In accordance with the present invention, an improved bifunctional cation-exchange composition has been formed which comprises synthetic resin support particles and both crown ether and non-crown ether functional groups attached thereto. The compositions of the present invention provide for novel, enhanced cation separation capabilities and, depending upon the type of functional groups employed, permit effective separation of cations which elute at approximately the same time off standard and commonly used cation-exchange columns. The presently described bifunctional cation-exchange compositions also permit the effective separation of one cation from a mixture comprising another cation that is present at a significantly greater concentration. Formed articles and methods employing the bifunctional cation-exchange composition are also provided.

21 Claims, 3 Drawing Sheets

OTHER PUBLICATIONS

Hayashita, T., et al. "Competitive Sorption of Alkali–Metal and Alkaline–Earth–Metal Cations by Carboxylic Acid Resins containing Acyclic or Cyclic Polyether Units", *Anal. Chem*, 63:1847–1850 (1991).

Okada, T., et al. "Efficient Chromatographic Evaluation of Crown–Ether Complexation with Alkali–Metal Ions", *Anal. Chem.*, 66:1654–1657 (1994).

Hayashita, T., et al. "Selective Sorption of Alkali–Metal Cations by Carboxylic Acid Resins Containing Acyclic or Cyclic Polyether Units", *Anal. Chem.*, 62:2263–2287 (1990).

Shirai, M., et al. "Photocrosslinked Poly(cinnamoyl Crown Ether) as a Stationary Phase in Ion Chromatography", *Journal of Polymer Science Part A*, 28:2563–2567 (1990).

Lamb, J.D., et al. "Chemically Suppressed Anion Chromatography Based on Macrocycle–cation Complexation", *Journal of Chromatography*, 482:367–380 (1989).

Hayashita, T., et al. "Selective Column Concentration of Alkali–Metal Cations with a Crown Ether Carboxylic Acid Resin", *Anal Chem.*, 63:1844–1847 (1991).

Buschmann, H.–J., "The Complexation of Alkaline Cations by Crown Ethers and Cryptands in Acetone", *Journal of Solution Chemistry*, 23(5):569–577 (1994).

Hiraoka, M., "Crown Ethers and Analogous Compounds", *Studies in Organic Chemistry*, 45:264–263 (1992).

Rey, M.A., et al. "Novel cation–exchange stationary phase for the separation of amines and of six common inorganic cations", *Journal of Chromatography A.*, 739:87–97 (1996).

Izatt et al., *Chem. Rev.* 85:271–339 (1985).

Small, *Ion Chromatography*, Plenum Press, New York, pp. 43–45 (1989).

The Dow Chemical Company, *Dowex::ION Exchange, Principles of Ion Exchange*, pp. 1–31, 1958–1959.

Guyot et al., *Prog. Polym. Sci.* 8:277–332 (1982).

Bradshaw et al., *Chem. Rev.* 79:37–52 (1979).

Lindoy, *Chem. Soc. Rev.* 4:421–441 (1975).

Christensen et al., *Science* 174:459–467 (1971).

Bradshaw et al., *J. Heterocycl. Chem.* 11:649–673 (1974).

Pedersen et al., *Angew. Chem. Internat. Edit.* 11:16–25 (1972).

Timko et al., *J. Amer. Chem. Soc.* 96:7097–7099 (1974).

McDaniel et al., *J. Heterocycl. Chem.* 26:413–419 (1989).

Jepson et al., *Pure & Appl. Chem.* 65:489–494 (1993).

Kirk et al., *Encyclopedia of Chemical Terminology*, 3rd ed., vol. 23, pp. 886–893 (1983).

BIFUNCTIONAL CROWN ETHER-BASED CATION-EXCHANGE STATIONARY PHASE FOR LIQUID CHROMATOGRAPHY

FIELD OF THE INVENTION

The present invention concerns novel compositions and methods useful for high performance cation-exchange chromatography.

BACKGROUND OF THE INVENTION

The present invention relates to a novel composition which is useful for performing improved liquid chromatography. More particularly, the present invention relates to an improved chromatographic composition and method for performing cation-exchange chromatography where attached to the synthetic resin support particles employed therein are both (1) standard ionic cation-exchange functional groups such as sulfonates, carboxylates and/or phosphonates and (2) non-ionic crown ether-based functional groups, thereby providing a bifunctional stationary phase which provides unique separation characteristics and selectivity for numerous cationic species including alkali metals, alkaline-earth metals, ammonia, amines, and the like. The presently described compositions, therefore, provide both novel and enhanced cationic separation capabilities.

The separation of cations from a mixture of different cations is typically accomplished by cation-exchange chromatography using a cation-exchange stationary phase with ionic, acidic groups as the cation exchangers (Small, *Ion Chromatography*, Plenum Press, New York (1989)). Cation-exchange chromatography is a well known technique for the analysis and separation of cations in solutions wherein the technique typically includes a chromatographic separation step using an eluent solution containing an electrolyte. During the chromatographic separation step, cations of an introduced sample are eluted through a chromatography column which comprises an insoluble stationary phase to which functional cation-exchange groups are attached. Cations traversing through the column and contacting the stationary phase are then capable of exchanging at these functional cation-exchange sites. Cations which interact with the cation-exchange sites for longer periods of time elute from the chromatography column after cations which interact with those sites for shorter periods of time. For the most part, ionic acidic groups such as sulfonate, carboxylate or phosphonate groups or mixtures thereof are employed as the principle functional groups of typical cation-exchange columns.

Depending upon the type of functional group that is linked to the stationary phase of a typical cation-exchange chromatography column, different cation elution profiles are obtained. For example, standard cation-exchange chromatography columns which employ a mixture of carboxylate and phosphonate functional groups provide an elution profile where lithium elutes from the column first followed in order by sodium, ammonium, potassium, magnesium, manganese and finally calcium (Rey et al., *Journal of Chromatography A* 739:87–97 (1996)). However, some cationic species elute in peaks which overlap with other cationic species that elute either immediately therebefore or immediately thereafter, thereby providing a less than completely efficient separation. Moreover, when one cationic species is present at significantly higher concentrations than another cationic species, separation of the two from a mixture thereof may be very difficult. Compositions and methods which provide a further means for enhancing the separation capabilities of cation-exchange chromatography columns, therefore, would be very useful.

Crown ethers are macrocyclic polyether compounds that are capable of selectively forming complexes with a variety of different cationic species. Izatt et al., *Chem. Rev.* 85:271 (1985), Bajaj et al., *Coord. Chem. Rev.* 87:55 (1988) and Lamb et al., *Journal of Chromatography* 482:367–380 (1989). These compounds are referred to as "crowns" because their chemical structures resemble the shape of the regal crown and because of their ability to "crown" cationic species by complexation. The ability of a crown ether molecule to complex with a cation is dependent upon the size of the hole formed by macrocyclic structure and, as a result, crown ethers of different sizes exhibit significantly different specificities for the complexation of cations. Buschmann et al., *Journal of Solution Chemistry* 23(5):569–577 (1994). For example, some crown ethers readily form complexes with sodium ion but are incapable of effectively complexing with potassium ion, other crown ethers effectively complex with cesium or rubidium but not with calcium or lithium. The cation complexation characteristics of many crown ether molecules have been well documented in the literature, e.g., see Hiraoka, "Crown Ethers and Analogous Compounds", Elsevier Science Publishers, Amsterdam, (1992) and Buschmann et al., (1994) supra.

Crown ether compounds have been made part of chromatographic stationary phases and employed as cation-exchange functional groups in cation-exchange chromatography columns. Blasius et al., *Journal of Chromatography* 167:307–320 (1978), Delphin et al., *Anal. Chem.* 50(7):843–848 (1978), Lamb et al., supra, Hayashita et al., *Anal. Chem.* 62:2283–2287 (1990), Shirai et al., *Journal of Polymer Science A: Polymer Chemistry* 28:2563–2567 (1990), Hayashita et al., *Anal. Chem.* 63:1844–1847 (1991), Hayashita and Bartsch, *Anal. Chem.* 63:1847–1850 (1991), Hiraoka, supra, Okada et al., *Anal. Chem.* 66:1654–1657 (1994) and Läubli et al., *Journal of Chromatography A* 706:103–107 (1995). However, cation-exchange resins based solely upon crown ether functional groups often exhibit poor chromatographic efficiency due to the slow rate of binding and release of the cation from the crown ether macrocycle structure and also may be too selectively "cation-specific" for many applications.

Crown ether functional groups have not previously been employed in combination with standard non-crown ether cation-exchange functional groups such as sulfonates, carboxylates or phosphonates which are independently and separately attached to a solid pahse. The combination of standard cation-exchange resins used in ion chromatography with the attachment of functional crown ethers to synthetic resin support particles, thereby resulting in bifunctional cation-exchange resins, is provided herein. These bifunctional resins provide novel cation separation capacity.

SUMMARY OF THE INVENTION

In accordance with the present invention, a novel bifunctional cation-exchange chromatography composition has been formed which allows for enhanced abilities to separate cations from a mixture of different cations, particularly finding use in enhancing the separation of cations which elute from standard sulfonate-, carboxylate- or phosphonate-based chromatography columns at approximately the same time and/or in detecting the presence of a trace amount of one cation in a large excess concentration of another different cation. More particularly, the present invention is based at least in part on the novel finding that by employing a bifunctional stationary phase having independently attached thereto both (1) standard non-crown ether cation-exchange groups such as sulfonates, carboxylates or phosphonates and (2) crown ether functional groups which form a complex with at least one specific cationic species, the normal elution profile of that cationic species may be shifted so that the elution of that species from the column is delayed, thereby providing for enhanced cationic separation. The present invention, therefore, provides a novel bifunctional stationary phase and methods of use thereof which provide unique separation characteristics for numerous cationic species including alkali metals, alkaline-earth metals, ammonia, amines, and the like.

In this regard, one aspect of the present invention provides a bifunctional cation-exchange composition for use in cation-exchange chromatography comprising:

(a) synthetic resin support particles;

(b) crown ether functional groups attached to said synthetic resin support particles, wherein said crown ether functional groups are capable of forming a complex with at least one cation present in an eluent in contact therewith, thereby delaying the elution of said at least one cation from said bifunctional cation-exchange composition, and (c) non-crown ether cation-exchange functional groups attached to said synthetic resin support particles, wherein said non-crown ether cation-exchange functional groups are capable of interacting with cations present in said eluent. In preferred embodiments, the non-crown ether cation-exchange functional groups are sulfonate, carboxylate or phosphonate groups or a mixture thereof and/or the crown ether groups attached to the support particles comprise two or more different crown ethers, usually having different complexation affinities for at least one cation. The crown ether functional groups may be covalently attached to the synthetic resin support particles through a linker chain which may be from about 1 to about 20 atoms in length wherein the atoms of the linker chain may be carbon, oxygen or sulfur atoms which are either unsubstituted or substituted, preferably with alkyl, alkoxyl, hydroxyalkyl or hydroxyl groups.

Another aspect of the present invention provides crown ether molecules which comprise a linker chain of from about 1 to about 20 atoms in length which terminates in a reactive alkenyl group, wherein the reactive alkenyl group provides a reactive site for covalently bonding the crown ether to a synthetic resin support particle. In preferred embodiments, the linker chain attached to the crown ether molecule is from about 2 to about 20 atoms in length and/or the terminal alkenyl group is a vinyl group.

Yet another aspect of the present invention provides a chromatography column which comprises the above described bifunctional cation-exchange composition for use in cation-exchange chromatography.

A further aspect of the present invention provides a method for separating a first cation from a second different cation in a mixture which comprises at least the first and second cations, wherein the method comprises contacting a chromatography column comprising the above described bifunctional cation-exchange composition with the mixture of cations. In the described method, the crown ether functionalities attached to the solid phase are capable of forming complexes with the first cation, thereby delaying its elution from the column relative to the elution of the second cation, thereby providing efficient separation of the two cations. In a preferred embodiment, the method is employed to separate a trace amount of one cation from a large excess concentration of another cation, preferably $NH_4^+$ and $Na^+$, respectively.

Other aspects of the present invention will become evident upon a reading of the present specification.

DETAILED DESCRIPTION OF THE INVENTION

A. Bifunctional cation-exchange chromatographic composition

The bifunctional cation-exchange compositions of the present invention comprise synthetic resin support particles wherein attached to those particles are (1) crown ether functional groups which are capable of forming complexes with at least one cation present in an eluent in contact therewith, thereby delaying the elution of said at least one cation from the compositions, and (2) non-crown ether cation-exchange functional groups which are also capable of interacting with cations present in the eluent. The crown ether and non-crown ether functional groups are independent of one another and may be made part of the chromatographic composition in an independent manner. These cation-exchange compositions are "bifunctional" in that they possess both crown ether and non-crown ether cation-exchange functionalities. "Monofunctional" as employed herein means that the cation-exchange composition only employs non-crown ether functional groups such as sulfonates, carboxylates, phosphonates or a mixture thereof.

The synthetic resin support particles of the presently described composition may be organic or inorganic in nature and may be formed from any suitable insoluble chromatographic material which will support the attachment of the crown ether and non-crown ether cation-exchange functional groups described below. For example, synthetic polymer ion-exchange resins such as poly(phenol-formaldehyde), polyacrylic, or polymethacrylic acid or nitrile, amine-epichlorohydrin copolymers, graft polymers of styrene on polyethylene or polypropylene, poly(2-chloromethyl-1,3-butadiene), poly(vinylaromatic) resins such as those derived from styrene, alpha-methylstyrene, chlorostyrene, chloromethylstyrene, vinyltoluene, vinylnaphthalene or vinylpyridine, corresponding esters of methacrylic acid, styrene, vinyltoluene, vinylnaphthalene, and similar unsaturated monomers, monovinylidene monomers including the monovinylidine ring-containing nitrogen heterocyclic compounds, copolymers of the above monomers, silica and C18-derivatized silica are all suitable.

The size range for synthetic resin support particles which find use in the present invention is typically from 5–20μ, although significantly smaller or larger particles may also find use. The particles may be either porous or non-porous depending upon the particular application desired.

The synthetic resin support particles of the present invention can be formed, for example, by well known suspension polymerization techniques which involve suspending droplets of monomer in an aqueous medium in which it is insoluble. Under suitable conditions, the monomer will polymerize. This can be accomplished by mixing the monomer with additives in a suspension medium. When this medium is agitated, the monomer disperses into droplets and agitation continues until polymerization is complete. Preferably, the synthetic resins used are of the macroporous type which are well known in the art, particularly including styrene-divinylbenzene copolymer. The copolymer can be prepared, for example, according to the method of Ikada et al., *Journal of Polymer Science* 12:1829–1839 (1974) or as described in U.S. Pat. No. 4,382,124 to Meitzner et al. Other techniques for the synthesis of synthetic resin support particles are well known in the art and can be found in U.S. Pat. Nos. 3,915,642, 3,918,906, 3,920,398, 3925,019 and the monograph "Dowex: Ion Exchange" 3rd. edition, (1964) published by the Dow Chemical Company, Midland, Mich.

Preferably, the synthetic resin support particles comprise beads of cross-linked polymer or copolymer, such as styrene-divinylbenzene copolymer which copolymerize in the presence of catalyst such as benzoyl peroxide, containing between about 0% to about 100% divinylbenzene monomer by weight. More preferably, the styrene-divinylbenzene copolymer contains between about 25% to about 80% divinylbenzene monomer by weight. A detailed review of the preparation, structure and morphology of styrene-based polymers is provided by Guyot and Bartholin, *Prog. Polym. Sci.* 8:277–332 (1982).

Attached to the synthetic resin support particles of the bifunctional cation-exchange compositions described herein are "non-crown ether cation-exchange functional groups". For the most part, the non-crown ether cation-exchange functional groups that find use herein are those that are well known and commonly employed in the field of cation-exchange chromatography, for example, sulfonate, carboxylate or phosphonate groups. Cation-exchange resins employing mixtures of the above described non-crown ether cation-exchange functional groups are also known in the art and will find use in the presently described bifunctional cation-exchange compositions. When a mixture of non-crown ether cation-exchange functional groups is employed, any mixture of such functional groups may by employed depending upon the desired application. In a preferred embodiment of the present invention, however, the mixture employed is a mixture of both carboxylate and phosphonate groups. When attached to the synthetic resin support particles (see below), the non-crown ether cation-exchange functional groups are capable of interacting with cations present in an eluent in contact therewith. Examples of stationary phases comprising such non-crown ether cation-exchange functional groups include, for example, IonPac CS3, IonPac CS10, IonPac CS12, IonPac CS12A, IonPac CG12A, IonPac CS14, IonPac Fast Cation I and II, OmniPac PCX-100 (all available through Dionex Corporation, Sunnyvale, Calif.) and a silica-based polymer coated stationary phase containing carboxylate cation-exchange functional groups described by Kolla et al., *Chromatographia* 23:465 (1987).

Also attached to the synthetic resin support particles of the bifunctional cation-exchange compositions described herein are crown ether functional groups. "Crown ether functional groups" as defined herein are capable of forming complexes with at least one cation present in an eluent in contact therewith, thereby delaying the elution of the complexed cation from the bifunctional cation-exchange composition. Many different crown ethers are known in the art, all of which will find use in the present invention for a variety of different applications, and their structures, methods of synthesis and cation complexation characteristics have been well documented (Blasius et al., (1978) supra, Delphin et al., (1978) supra, Lamb et al., (1989) supra, Hayashita et al., (1990) supra, Shirai et al., (1990) supra, Hayashita et al., (1991) supra, Hayashita and Bartsch, (1991) supra, Hiraoka, (1992) supra, Buschmann et al., (1994) supra, Okada et al., (1994) supra and Laubli et al., (1995) supra. For example, crown ethers which find use in the present invention include (without being limiting of the present invention) 9-crown-3, 12-crown-4, 15-crown-5, 18-crown-6, 21-crown-7, 24-crown-8, 27-crown-9, 30-crown-10 and crown ether molecules having one or more substituents which are aromatic, such as benzo- or dibenzo-crown ethers, heteroaromatic, particularly derivatives of pyridine, heterocyclic non-aromatic cyclic rings containing oxygen, sulfur or nitrogen, such as tetrahydrofuran, piperidine and pyrrolidine, alicyclic substituents, saturated carbon rings such as cyclopentane and cyclohexane, aliphatic substituents, and the like (see Christensen et al., *Chem. Rev.* 74:351 (1974), Lindoy, *Chem. Soc. Rev.* 4:421 (1975), Bradshaw et al., *J. Heterocycl. Chem.* 11:649 (1974), Christensen et al., *Science* 174:459 (1971) and Pedersen et al., *Angew. Chem. int. Ed. Engl.* 11:16 (1972)). In a preferred embodiment, the crown ether employed is 18-crown-6. Such crown ethers are either commercially available or may be synthesized using techniques that are well known in the art.

It is also well known in the art that one or more of the oxygen atoms in the crown ether macrocyclic ring structure may be substituted by either nitrogen (Buschmann et al., (1994) supra), sulfur (Buschmann et al., (1994) supra), phosphorous (Parles et al., *J. Amer. Chem. Soc.* 92:3500 (1970)) or —$CH_2$ (Richman et al., *J. Amer. Chem. Soc.* 96:2268 (1974) and Timko et al., *J. Amer. Chem. Soc.* 96:7097 (1974) and/or the carbon atoms of the macrocyclic structure may be optionally substituted by alkyl, alkoxy, carboxy, carboxyalkyl, hydroxyalkyl or hydroxyl groups. Use of all of these derivatized crown ether molecules is encompassed by the present invention.

Crown ethers employed in the presently described bifunctional cation-exchange compositions will be capable of forming a complex with at least one cationic species present in an eluent in contact therewith. Usually, the crown ether employed will exhibit a selectivity for complexing with from about 1 to 3 different cationic species, preferably from about 1 to 2 different cationic species and more preferably only one cationic species. When a crown ether selectively complexes with only one cationic species, that species is usually $K^+$, $Na^+$, $Li^+$, or $NH_4^+$. For cations which do not complex with the crown ether molecule(s) employed, the elution profile of those cations is dependent solely upon the types of non-crown ether cation-exchange groups employed in the bifunctional composition. The elution of those cations which do, however, form a complex with the crown ether(s) employed is delayed relative to the others. As such, the selectivity of the column for any particular cationic species can be optimized by employing an appropriate crown ether molecule which has a known selectivity of interest. As described above, the complexation selectivities of a wide range of different crown ether molecules has been well documented.

For certain applications, the bifunctional cation-exchange compositions of the present invention may comprise two or more different crown ether functional groups, each of the crown ether functional groups having the same or different cation complexation specificities. In other words, when two or more different crown ether functional groups are employed in a bifunctional cation-exchange composition, they may have the same complexation affinities for a particular cation or may have different affinities for complexation with at least one cation. Usually, from about 1 to 3 different crown ether functional groups are employed in a bifunctional cation-exchange composition, preferably from about 1 to 2 different crown ether functional groups and more preferably only one crown ether functional group.

Attached to the crown ether functional group is a linker chain which serves to attach the crown ether functional groups to the synthetic resin support particles. Linker chains which find use herein comprise a straight chain (not including branching) of from about 1 to about 20 atoms in length which has a terminal reactive alkenyl group to serve as a potential site for covalent attachment of the crown ether to the synthetic resin support particles. As such, prior to their attachment to the synthetic resin support particles, the crown ethers compounds of the present invention have the following structure:

CE—L—RA where "CE" represents the crown ether molecule as described above, "L" represents the linker chain and "RA" represents the terminal reactive alkenyl group, preferably a vinyl group. The linker chain may be attached to the crown ether at any site that does not significantly affect the ability of the crown ether to complex with a cation of interest. As described above, the straight backbone of the linker chain "L" is from about 1 to about 20 atoms in length, usually from about 2 to about 20 atoms in length, more usually from about 3 to about 15 atoms in length, preferably from about 4 to about 10 atoms in length, more preferably from about 4 to about 7 atoms in length and most preferably 5 atoms in length. The linker chain may be straight-chain or branched, preferably straight-chain, and may comprise saturated or unsaturated carbon atoms, heteroatoms such as oxygen, nitrogen or sulfur atoms and/or aromatic groups. The linker chain is preferably composed of saturated or unsaturated carbon atoms, more preferably saturated carbon atoms. In the case where the linker chain is branched, the straight linker chain backbone will still be from about 1 to about 20 atoms in length, wherein the branched linker group will usually comprise no more than about 40 carbon atoms total, preferably no more than about 30 carbon atoms total and more preferably no more than about 25 carbon atoms total. Branching may occur at any atom in the linker chain where it does not significantly adversely affect column performance which may be determined by routine experimentation.

As described above, the linker chain "L" may comprise carbon atoms or heteroatoms such as oxygen or sulfur. Usually, the linker group will contain from 0 to about 3 heteroatoms, more usually from 0 to 2, preferably from 0 to 1 and more preferably 0 heteroatoms. Heteroatoms may be placed in the linker chain at positions where they will have no significant adverse effect on the cation separation characteristics of the composition. The determination of where heteroatoms may effectively be positioned in the linker chain is well within the skill level in the art.

One or more atoms of the linker chain "L" may also be independently alkyl-, alkoxyl-, hydroxyalkyl- or hydroxyl-substituted. Such substitutions may conveniently be made at any atom of the linker chain using standard synthetic techniques. For the most part, alkyl, alkoxyl and hydroxyalkyl substituents have less than about 10 carbon atoms, usually less than about 6 carbon atoms, more usually less than about 4 carbon atoms, preferably less than about 3 carbon atoms and more preferably 1 carbon atom.

The preparation of crown ether functional groups to which linker chains are covalently attached is well within the skill level of the ordinarily skilled artisan. For example, Ikeda et al., *J. Org. Chem.* 45:5355 (1980) and McDaniel et al., *J. Heterocycl. Chem.* 26:413 (1989) describe known methods for preparing a variety of different derivatized crown ether molecules.

The non-crown ether cation-exchange functional groups and the crown ether functional groups may be attached to the synthetic resin support particles by methods which are known in the art. Either functional group type may be attached to the synthetic stationary phase first followed subsequently by attachment of the other or the different types of functional groups may be attached to the stationary phase simultaneously.

The non-crown ether cation-exchange functional groups and crown ether functional groups described above may be "attached" to the synthetic resin support particles by a variety of means. For example, the functional groups which find use herein may be covalently bonded or grafted to the surface of the synthetic resin support particle by employing the method described in U.S. Pat. No. 5,503,933, issued to Afeyan et al.

Specifically, in the method described by Afeyan et al., both the molecule(s) being attached to a solid support and the solid support itself possess available unsaturated groups, such as reactive alkenyl groups, wherein the compound becomes covalently bonded to the solid support by a free radical reaction between available unsaturated groups. Because the non-crown ether and crown ether functional groups and the synthetic resin support particles employed herein will possess such available unsaturated groups, the described method may be employed to covalently attach the two types of functional groups to synthetic resin support particles (see Jepson et al., *Pure Appl. Chem.* 65:489 (1993).

If the crown ether functional group is to be attached to the solid support before the non-crown ether functional group, either chemical bonding or adsorption of the crown ether to the non-functionalized solid support can be employed. For example, crown ether-based polymer resins may be produced by copolymerizing divinylbenzene with crown ether vinyl monomers. Divinylbenzene crosslinked vinylbenzyl chloride copolymers can be reacted with functional crown ethers to provide a covalently bonded stationary phase. Crown ether containing condensation polymers may be produced by condensation of formaldehyde in formic acid with dibenzocrown derivative or by condensation of phenol and formaldehyde with monobenzocrown ethers.

In addition, the non-crown ether and crown ether functional groups may be independently or simultaneously incorporated into a latex polymer which is deposited onto the surface of the synthetic resin support particles as described in U.S. Pat. No. 5,324,752. Specifically, as described in U.S. Pat. No. 5,324,752, the preparation of latex polymer involves the polymerization of one or more monomers (which contain either of both of the non-crown ether or crown ether functional groups and having a reactive alkenyl group at one terminus) with a divinyl cross-linking monomer which has an available alkenyl group at each terminus and optionally another monoalkenyl monomer. The amount of the optional monoalkenyl monomer added to the reaction provides a means for diluting or controlling the relative number of cation-exchange sites that exist in the final polymer product. The above components are polymerized in the aqueous phase to form a suspension of colloidal particles which are commonly called latex which, in turn, are irreversibly attached to the solid phase via a "dispersant" material that possesses functional sites that irreversibly attach to both the latex polymer and the solid phase, thereby forming a permanent attachment therebetween. The polymerization reaction may be performed by conventional emulsion polymerization techniques, such as by heating and stirring a suspension of monomers in a suitable solvent in the presence of a suitable emulsifying agent. Alternatively, the polymerization may be carried out by a suspension, bulk or solution process followed by grinding the resin to a desired size by mechanical means such as ball mills, rod mills or the like.

The cross-linking and optionally-added monoalkenyl diluent monomers may be formed from many different well-known synthetic reactions. Specifically, cross-linking monomers are molecules possessing alkenyl groups at each terminus wherein the group separating the terminal alkenyl groups may be, for example, aromatic or aliphatic and may possess one or more heteroatoms such as oxygen or sulfur. Optionally-added monomers possess one terminal alkenyl group and may be styrene- acrylate- or methacrylate-based. Specific, dialkenyl cross-linkers which find use in the present invention include, for example, divinylbenzene, diethyleneglycol dimethacrylate and ethylene methacrylate or respective acrylates thereof. Specific optionally-added monoalkenyl monomers include, for example, styrene, methyl methacrylate and 2-ethoxyethyl methacrylate or respective acrylates thereof. Preferably, the relative reactivities of the selected monomer components are similar, thus assuring an approximately even distribution of each of the monomer units in the final latex polymer product.

The latex polymer prepared as described above may be "deposited" onto the surface of a synthetic resin support particle (and thereby "attached" thereto) via a bridge of "dispersant" material which irreversibly binds to both the latex polymer and the solid support particles, thereby forming a bridge between (see U.S. Pat. No. 5,324,752). Depending upon solid support particles and the latex polymer, the dispersant may be any material which can inhibit or prevent agglomeration during suspension in the aqueous medium used for polymerization. For example, the dispersant may be selected from any one of the methacrylic aid copolymers, polymaleates, sulfonated polymers, polyvinylpyrrolidone esters, plant-based gums, lignins and cellulose derivatives. In a preferred embodiment, the dispersant material can be formed of polyvinylalcohol, sulfonated lignin, polyvinylpyrrolidine, gum arabic, gelatin, maleic acid-vinylacetate copolymer or styrene-maleic anhydride copolymer. Usually, the dispersant comprises between about 0.1% to about 25% dispersant by weight water.

The irreversible attachment of a dispersant to the synthetic resin support particles can occur by covalent bonding via various mechanisms. one mechanism is by covalent bonding via a free radical polymerization reaction. Free radicals are typically generated in the resin support particle polymer being formed and sustain polymerization of the polymer as well as promote branching, the formation of new chains of bridging and cross-linking. An initiator can be utilized in the polymerization step of the resin support particle which starts and maintains the polymerization reaction. If the initiator concentration is high enough, more free radical sites are generated than can be consumed in the polymerization reaction, and other chemical species that are present, such as dispersant, can react with them. Thus, the dispersant can covalently link to the resin substrate particle polymer. For example, it has been suggested that polyvinylalcohol dispersant can become covalently linked to another polymer if the initiator concentration is high enough. Ikada et al., *Journal of Polymer Science* 12:1829–1839 (1974). While studying the process of particle formation during suspension polymerization, it was observed that polyvinyl chloride can be chemically grafted to the dispersant. Kirk et al., *Encyclopedia of Chemical Technology*, 3rd ed. Vol. 23, pp. 888–890 (1983).

A second method of irreversible attachment of dispersant to the resin support particles can be by permanent physical entanglement. In this mechanism, relatively small polymers, such as sulfonated lignin dispersant or polyvinylalcohol dispersant can become permanently entangled with the resin support particle polymer as the polymerization reaction occurs.

The irreversible attachment of dispersant to the latex polymer produced as described above can occur by covalent bonding, such as described previously herein, or by electrostatic forces. For example, the synthetic resin support particles can be made of styrene-divinylbenzene copolymer and the dispersant can be a mixture of sulfonated lignin and gum arabic dispersant. The sulfonated lignin can irreversibly attach to the synthetic resin support particles either by covalent bonding or by permanent entanglement, thereby providing a negatively-charged surface to which the latex polymer can be agglomerated electrostatically. Specific methods for carrying out the above may be found in U.S. Pat. No. 5,324,752.

Crown ether functional groups can also be attached to a synthetic resin support having standard non-crown ether functional groups already attached thereto by treating the standard functionalized solid support with acid chloride and then reacting the composition with mono-aza crown to form a stable covalent amide linkage. Also a hydroxymethyl crown may be attached through ether formation by employing a chloromethyl-containing resin. A crown ether with a linker group may also be attached to through a terminal silicon-containing functional group to a silica surface.

The number of non-crown ether cation-exchange functional groups as compared to the number of crown ether functional groups attached to the solid support can vary greatly depending upon the application desired. Usually, the number of non-crown ether cation-exchange functional groups attached to a solid phase is from about 35–65 number % of the number of crown ether functional groups attached thereto, preferably from about 40–60 number % and more preferably from about 45–55 number %.

After attaching the non-crown ether cation-exchange and crown ether functional groups to the synthetic resin support particles as described above, the functionalized particles can be packed into chromatographic columns using well known methodology and be used for high performance cation-exchange chromatography. For example, U.S. Pat. No. 4,351,909 discloses methods for preparing chromatography columns where the agglomeration of latex polymers onto synthetic resin support particles or covalent bonding thereto is performed before the column is pressure packed with those particles. On the other hand, chromatography columns may be pressure packed with synthetic resin support particles followed by the subsequent agglomeration of the latex polymer thereon. See U.S. Pat. Nos. 4,438,047 and 4,351,909.

B. Uses of the bifunctional cation-exchange compositions

The bifunctional cation-exchange chromatography compositions of the present invention are primarily useful for the separation of cations in aqueous eluent solutions employed in cation-exchange chromatography. This provides for the ability to carry out a variety of different applications. For example, attempting to detect the presence of trace amounts of ammonium in the presence of large concentrations of sodium in drinking water by using standard sulfonate-, carboxylate- and/or phosphonate-based cation-exchange columns has proven to be difficult because the large sodium peak often obscures the much smaller ammonium peak that follows immediately thereafter. However, by employing a bifunctional cation-exchange composition of the present invention which comprises a crown ether functional group that specifically complexes with the ammonium cation but not with the sodium cation, the elution of ammonium may be delayed relative to sodium, thereby providing a significantly more effective separation and for the ability to detect the small ammonium peak. As such, the presently described bifunctional compositions are well suited for detecting the presence of trace amounts of one cation in the presence of a large excess of another different cation. In this regard, the cation-exchange resins described herein are useful for detecting the presence of a first cation in the presence of a large excess of a second different cation. Usually, the second cation is present at a concentration which is 0- to 4000-fold greater than the first cation, preferably from about 0- to 2000-fold greater than the first cation and more preferably from about 0- to 500-fold greater than the first cation.

Moreover, while commonly employed cation-exchange columns are useful for separating cations from various mixtures of cations, the separation achieved is often less than desired because two or more different cations may elute at approximately the same time. By employing a bifunctional cation-exchange resin wherein the crown ether functionality is selective for complexing with only one of the two cations that normally elute at approximately the same time, however, an effective and complete separation may be achieved. Therefore, the presently described bifunctional cation-exchange compositions may readily be employed in methods for separating a first cation from a second cation in a mixture which contains both cations, wherein the crown ether functional group employed is selective for complexing only with the first cation but not the second cation.

Further details of the invention are illustrated in the following non-limiting examples.

EXAMPLE 1

Preparation of 2-(Oct-7-enyl)-18-crown 6.
Step 1. 7-Octenyl hexaethylene glycol.

Potassium metal (11.1 g) was added to anhydrous dioxane (200 ml) in a reaction vessel maintaining a dry nitrogen atmosphere. The content of the vessel were stirred and heated to approximately 50° C. Pentaethylene glycol (137 g, freshly distilled) was then added in several portions while maintaining the temperature below about 85° C. After the potassium metal was completely dissolved, stirring of the mixture was continued for approximately 1 hour and then 49 g of 1,2-epoxydecene was added. The reaction mixture was then left stirring at 80° C. for 12 hours. Then, after the reaction was cooled to room temperature, the mixture was cautiously acidified with concentrated HCl to pH=2 and the solids were filtered off. The filtrate was evaporated to give a viscous liquid (203 g). The liquid was fractionated under vacuum, first collecting an excess of pentaethylene glycol at 143°–162° C./0.1 mm Hg (71 g) followed by collection of pure octenyl derivative of hexaethylene glycol (bp 210°–218° C./0.05 mmHg, 66 g).

Step 2. 2-(7-Octenyl)-18-crown-6.

Potassium hydroxide (34 g) was powdered using a mortar and placed in a flask containing anhydrous dioxane (50 ml). The slurry of hydroxide was stirred and heated in an atmosphere of dry nitrogen to 60° C. At this temperature, a solution of octenyl derivative of hexaethylene glycol (32 g) and p-toluenesulphonyl chloride (15.7 g) in anhydrous dioxane (150 ml) was added very slowly over a period of 6 hours. The reaction mixture was left stirring at 55°–60° C. for 12 hours and then allowed to equilibrate to room temperature. The solids were then filtered off and the filtrate was evaporated until all of the remaining dioxane was removed. The residue (48 g; brown viscous liquid) was diluted with a small amount of methylene dichloride (50 ml) and passed through a short bed of alumina. The column was eluted with hexane (500 ml) and methylene dichloride (500 ml). The combined eluates were evaporated to give 37 g of a red viscous liquid. This liquid contains 2-(oct-7-enyl)-18-crown-6 as shown by gas chromatography in a concentration of approximately 60%. Pure crown ether can be obtained in approximately 25–50% yield (approximately 12 g) by fractionation under vacuum and collection the product with a boiling point of approximately 162°–166° C./0.04 mm Hg. However, the partially purified crude product can be used without distillation.

EXAMPLE 2

Preparation of 2-(10-undecylenyloxymethyl)-18-crown-6

The preparation of 2-(10-undecylenyloxymethyl)-18-crown-6 can be performed essentially as described by Wu et al., *Anal. Chem.* 62:968 (1990). However, for purposes of the present synthesis, the compound was prepared by the method of Manecke et al., *Makromol. Chem.* 182:3017 (1981) adapted as described below.

To a suspension of sodium hydride (0.7 g of 60% oil dispersion) in dioxane (25 ml, anhydrous) under an atmosphere of anhydrous argon a solution of 2-hydroxymethyl-18-crown-6 (1.0 g) in dioxane (25 ml, anhydrous) was added. The resulting mixture was stirred at room temperature for 75 minutes and then a solution of 10-undecylenyl bromide (1.6 g) in dioxane (10 ml, anhydrous) was added. Stirring was continued for 15 hours. The reaction mixture was then poured into water, acidified to pH=1 with dilute HCl and extracted with methylene dichloride. The combined extracts were then washed with water and dried with magnesium sulfate. Remaining solvents were removed and the residue was subjected to evaporative distillation under vacuum. Undecylenyloxymethyl crown was collected at 140°–160° C./0.04 mmHg. Yield—1.4 g.

EXAMPLE 3

Preparation of 2-(4-vinylbenzyloxymethyl)-18-crown-6

The preparation of 2-(4-vinylbenzyloxymethyl)-18-crown-6 was performed essentially as described by Manecke et al., *Makromol. Chem.* 182:3017 (1981) adapted as described below. To a stirred under anhydrous argon suspension of sodium hydride (1.7 g, 60% dispersion in oil) in dioxane (50 ml), 2-hydroxymethyl-18-crown-6 (4.0 g) was added. After 45 minutes at room temperature, a solution of 4-vinylbenzyl chloride (4.5 g) in dioxane (10 ml) was added. The resulting mixture was then stirred at room temperature for 15 hours, poured into water and extracted with methylene dichloride. The combined extracts were washed with water and dried with magnesium sulfate. Remaining solvents were removed and the residue was purified using chromatography on silica gel. The resulting derivatized crown ether was eluted with a methanol-ammonium hydroxide (25:1) mixture. Yield 5.5 g.

EXAMPLE 4

Preparation of 2-allyloxymethyl-18-crown-6

The preparation of 2-allyloxymethyl-18-crown-6 was performed essentially as described by Ikeda et al., *J. Org. Chem.* 45:5355 (1980) adapted as described below.
Step I. Allyloxymethyl hexaethylene glycol.

Potassium metal (4.3 g) was placed in a flask containing anhydrous dioxane (100 ml). The contents of the flask were stirred in an atmosphere of anhydrous argon and pentaethylene glycol (50.3 g) was then added in several small portions over 15 minutes. The temperature of reaction mixture was slowly brought to approximately 75° C. and the mixture was stirred until all of potassium was dissolved and then for 1 hour more. Allyl glycidyl ether (12.5 g) was added in one portion and the resulting mixture was stirred at 80°–100° C. for 15 hours. At the end of the reaction, the mixture was cooled to room temperature and carefully acidified with concentrated HCl to pH=1 and the precipitated solids were filtered off. The filtrate was transferred to a distillation flask and the solvent was removed. The residue was fractionated under vacuum, collecting excess of pentaethylene glycol (bp 138°–145° C./0.05 mmHg; 33 g) followed by product (allyloxymethyl hexaethylene glycol; bp 180°–184° C.°C./0.04 mmHg; 18 g).

Step II. 2-Allyloxymethyl-18-crown-6.

Potassium hydroxide pellets (18.6 g) were thoroughly powdered in a mortar and placed in a reaction flask along with anhydrous dioxane (90 ml). While maintaining atmosphere of anhydrous argon and vigorously stirring at 60° C., a solution containing p-toluenesulfonyl chloride (9.9 g) and allyloxymethyl derivative of hexaethylene glycol (17.8 g) in anhydrous dioxane (125 ml) was added dropwise over 6 hours. After complete addition, the reaction mixture was left stirring at 60° C. for 15 hours. The reaction mixture was then cooled to room temperature and the solids were filtered off. The filtrate was concentrated under reduced pressure to give the crude product, a brown liquid (25 g). This crude product was then subjected to fractionation under vacuum collecting the fraction with bp 122°–131° C./0.02 mmHg. Yield 7.0 g.

EXAMPLE 5

Preparation of 2-(3-butenyl)-18-crown-6

This compound may be prepared as described by McDaniel et al., *J. Heterocycl. Chem.* 26:413 (1989) but the preparation herein was performed essentially as described by Ikeda et al., *J. Org. Chem.* 45:5355 (1980) adapted as described below.
Step I. 3-Butenyl hexaethylene glycol.

Potassium metal (4.5 g) was placed in a flask containing anhydrous dioxane (150 ml). The contents of the flask were stirred in an atmosphere of anhydrous argon and then pentaethylene glycol (60 g) was added in several small portions over 15 minutes. The temperature of reaction mixture was slowly brought to about 80° C. and the mixture was then stirred until all of potassium was dissolved and then for 2 more hours. 1, 2-Epoxyhexene (12 g) was added in one portion and the resulting mixture was stirred at 80°–100° C. for 15 hours. The mixture was then cooled to room temperature and carefully acidified with concentrated HCl to pH=1 and the precipitated solids were filtered off. The filtrate was then transferred to a distillation flask and the solvent was removed. The residue was fractionated under vacuum, collecting an excess of pentaethylene glycol (bp 138°–145° C./0.05 mmHg; 33 g) followed by the product (butenyl hexaethylene glycol; bp 162°–168° C.°C./0.04 mmHg; 22 g).

Step II. 2-(3-Butenyl)-18-crown-6

Potassium hydroxide pellets (26 g) were thoroughly powdered in a mortar and placed in the reaction flask along with anhydrous dioxane (50 ml). While maintaining an atmosphere of anhydrous argon and vigorously stirring at 60° C., a solution containing p-toluenesulfonyl chloride (14.5 g) and butenyl derivative of hexaethylene glycol (24.8 g) in anhydrous dioxane (125 ml) was added dropwise over 6 hours. The reaction mixture was then left stirring at 60° C. for 15 hours. The reaction mixture was then cooled to room temperature and the solids were filtered off. The filtrate was concentrated under reduced pressure to give a crude product, brown liquid, 37 g. This crude product was then subjected to fractionation under vacuum collecting the fraction with bp 148°–155° C./0.1 mmHg. Yield 13.5 g.

EXAMPLE 6

Cation-exchange chromatography with standard versus bifunctional columns.

Figure 1:
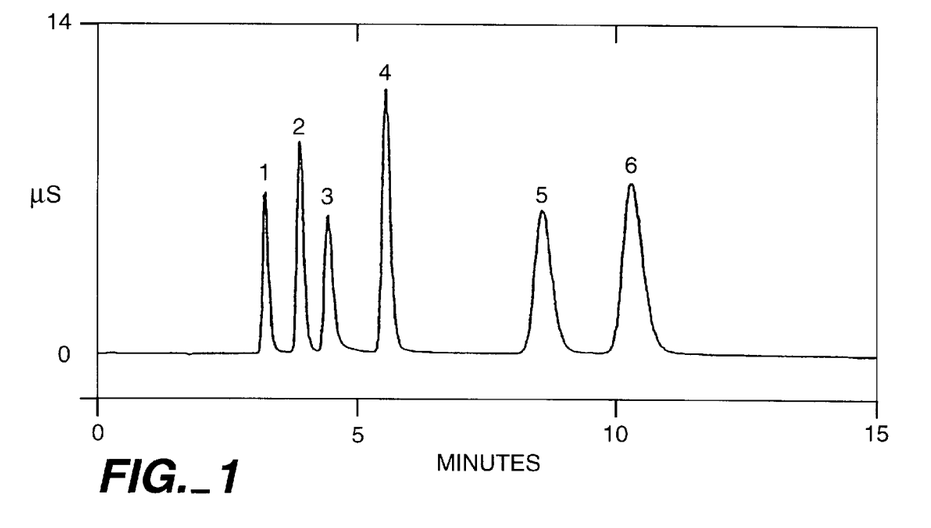
FIG. 1. Elution profile of various cations on a typical carboxylate/phosphonate-based cation-exchange column. Presented is the elution profile of a mixture of lithium, sodium, ammonium, potassium, magnesium and calcium ions from a standard carboxylate/phosphonate-based cation-exchange chromatography column. The peak numbers refer to the following cations: 1-lithium, 2-sodium, 3-ammonium, 4-potassium, 5-magnesium and 6-calcium.

The advantages of the bifunctional cation-exchange compositions of the present invention were demonstrated by comparison of chromatographic results obtained with a bifunctional column to those obtained with standard cation-exchange columns. Specifically, FIG. 1 shows the chromatographic separation of alkali metals, alkaline-earth metals and ammonium using a standard carboxylate/phosphonate grafted stationary phase (IonPac CS12A, Dionex Corporation, Sunnyvale, Calif.). The cation mixture contained the following cations present at the following concentrations: lithium-0.5 mg/L, sodium-2.0 mg/L, ammonium-2.5 mg/L, potassium-5.0 mg/L, magnesium-2.5 mg/L and calcium-5.0 mg/L. The eluant was 22 mN sulfuric acid with a flow rate of 1.0 ml/minute and an injection volume of 25 μl.

As shown in FIG. 1, the standard cation-exchange column successfully separated each of the six different cations present in the mixture over a period of less than 15 minutes. However, while the different cations present in the mixture were separated to some extent, lithium, sodium, ammonium and potassium eluted very near one another, thereby raising the possibility that the separation was less than complete. Note that the resolution of the sodium and ammonium peaks was less than desired.

To determine whether a bifunctional cation-exchange composition of the present invention comprising a crown ether functional group which complexes with potassium ions to a great extent and with ammonium ions to a lesser extent was capable of selectively enhancing the cationic separation from a mixture of different cations, 18-crown-6 functional groups were covalently grafted to the above described carboxylate/phosphonate-based stationary phase to provide a bifunctional phase. A mixture of cations having the following concentrations was prepared and was then applied to the bifunctional column: lithium-1.0 mg/L, sodium-4.0 mg/L, ammonium-10.0 mg/L, potassium-10.0 mg/L, magnesium-5.0 mg/L and calcium-10.0 mg/L. The eluant was 10 mN sulfuric acid and 9% acetonitrile with a flow rate of 1.2 ml/minute and an injection volume of 25 μl. The results of this chromatographic separation are shown in FIG. 2.

Figure 2:
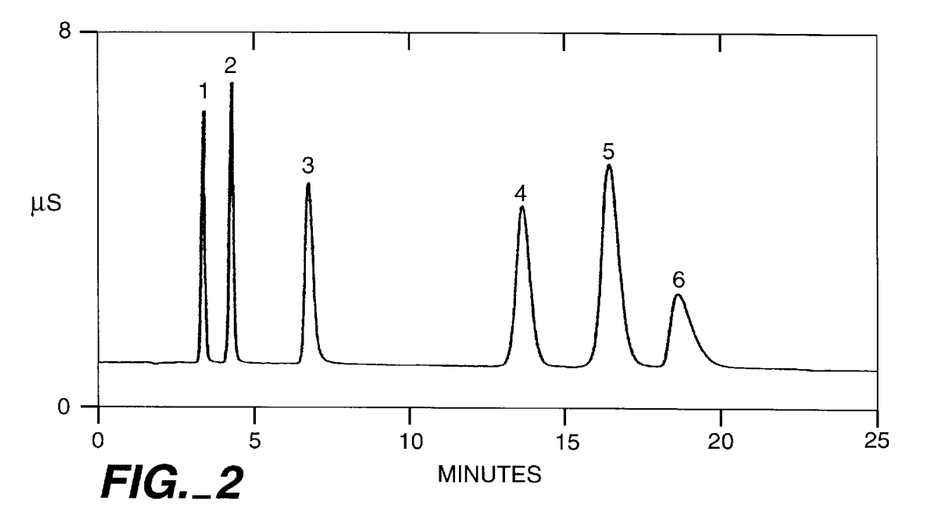
FIG. 2. Elution profile of various cations on a bifunctional cation-exchange column of the present invention. Presented is the elution profile of a mixture of lithium, sodium, ammonium, potassium, magnesium and calcium ions from a bifunctional cation-exchange chromatography column of the present invention. The peak numbers refer to the following cations: 1-lithium, 2-sodium, 3-ammonium, 4-magnesium, 5-calcium and 6-potassium.

As shown in FIG. 2, the elution profile for lithium, sodium, magnesium and calcium cations was very similar to that obtained with the standard cation-exchange column as shown in FIG. 1, consistent with the fact that the crown ether functional groups attached to the column were not specific for complexation with these different cations. In contrast, however, the resolution between the sodium and ammonium peaks was enhanced and the elution of the potassium cation was significantly delayed as compared to its elution off of the standard column of FIG. 1. These results are consistent with the idea that potassium and ammonium cations formed complexes with the crown ether functional groups attached to the bifunctional column, thereby causing a significant delay in the rate at which both ammonium and potassium eluted from the column. This delay allowed greater separation of the sodium and ammonium peaks as well as clear separation of potassium from lithium, sodium and ammonium. As such, the bifunctional column was successful at selectively moving one cation (potassium) away from other closely eluting cations (lithium, sodium and ammonium) in the elution profile, thereby providing enhanced separation characteristics.

Moreover, since the non-crown ether cation-exchange functional group is relatively hydrated, it unexpectedly improves the kinetics of the nearby crown ether functionality.

EXAMPLE 7

Detection of trace amounts of one cation in the presence of excess amounts of another cation The bifunctional cation-exchange column employed in FIG. 2 above was used to determine if the presence of trace amounts of ammonium cation in a 4000-fold excess of sodium cation could be detected. The cationic mixture applied to the bifunctional column had the following cations at the following concentrations: sodium-100 mg/L and ammonium-0.025 mg/L. The eluant was 10 mN sulfuric acid and 9% acetonitrile with a flow rate of 1.2 ml/minute and an injection volume of 25 μl. The results of this chromatographic separation are shown in FIG. 3.

Figure 3:
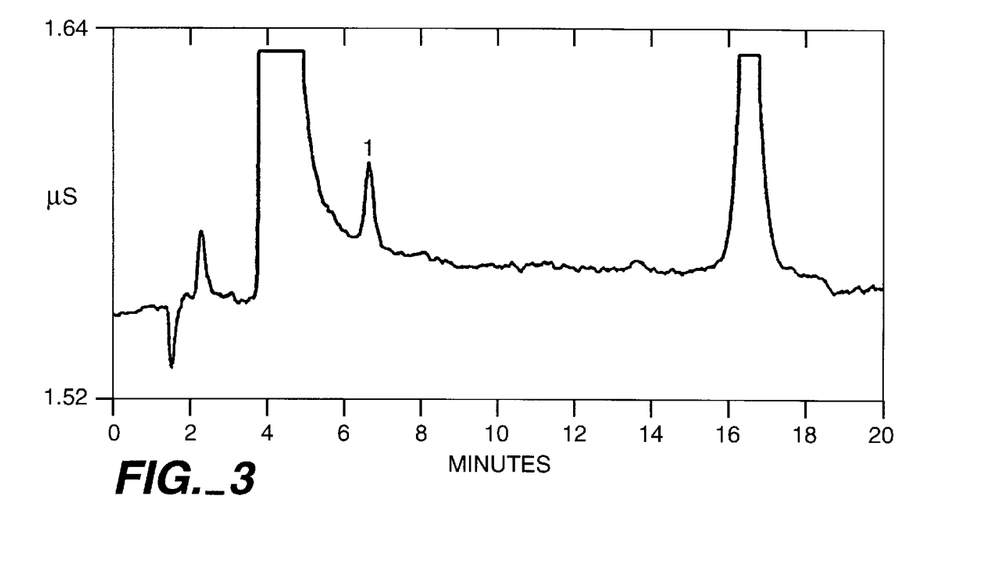
FIG. 3. Detection of trace amounts of ammonium cation in the presence of a 4000-fold excess of sodium cation on a bifunctional cation-exchange column of the present invention. Presented is the elution profile of a mixture of sodium and ammonium cations from a bifunctional cation-exchange chromatography column of the present invention. Peak number 1 is the ammonium peak.

The results presented in FIG. 3 demonstrate that by employing a chromatography column comprising a bifunctional cation-exchange composition of the present invention, the peak corresponding to the trace amount of ammonium cation present in the mixture could be readily detected as a result of the improved resolution of the peaks. This resolution and detection would not be possible if the stationary phase was not bifunctional. As such, the presently described bifunctional cation-exchange chromatography compositions allow for the successful detection of trace amounts of a particular cation in the presence of at least a 4000-fold excess of another different cation.

EXAMPLE 8

Grafting of carboxylate-functional groups and a linker onto a macroporous polymeric resin and use for cation separation.

0.36 g of maleic anhydride was dissolved in 9.64 g of propylene carbonate. Once dissolved, 0.36 of ethyl vinyl ether was added and the reaction mixture was mixed well. 2.4 g of macroporous (450 m$^2$/g, 55% cross-linked) polymeric resin was then added to the reaction mixture, the resin was dispersed well and then 0.06 g of Vazo 52 was added. The mixture was sonicated for approximately 5 minutes and then placed in an oven to tumble at 52° C. for approximately 6 hours. The reaction mixture was then removed from the oven, filtered in a Buchner funnel and washed with alternate aliquots of boiling water and acetone for at least 3 washing cycles. The resin was left to sit in 200 mL of 0.5M NaOH and then washed consecutively with water and 1M HCl.

The above standard cation-exchange resin was packed into a chromatography column (4×250 mm) and employed to separate a mixture of lithium, sodium, ammonium, potassium, magnesium and calcium cations in 2.2 mN sulfuric acid as described in Example 6 above with a flow rate of 1.0 mL/minute. The separation profile obtained is shown in FIG. 4.

Figure 4:
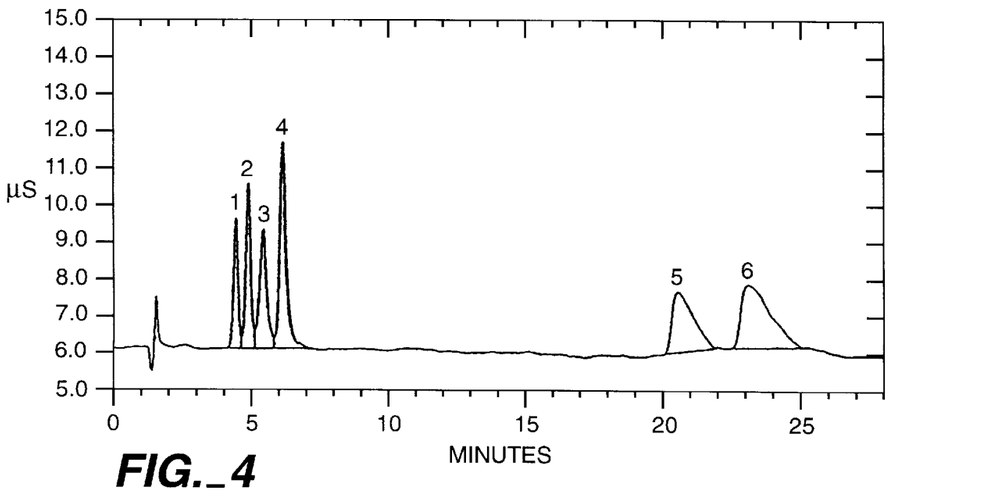
FIG. 4. Elution profile of various cations on a standard monofunctional carboxylate-based cation-exchange column. Presented is the elution profile of a mixture of lithium, sodium, ammonium, potassium, magnesium and calcium ions from a standard monofunctional carboxylate-based cation-exchange chromatography column. The peak numbers refer to the following cations: 1-lithium, 2-sodium, 3-ammonium, 4-potassium, 5-magnesium and 6-calcium.

As shown in FIG. 4, the standard cation-exchange column was capable of separating the cations, however, the separation of sodium, ammonium and potassium cations was very poor.

EXAMPLE 9

Simultaneous grafting of both crown ether and non-crown ether carboxylate functional groups and a linker onto a macroporous polymeric resin and use for cation separation.

0.36 g of maleic anhydride was dissolved in 9.64 g of propylene carbonate. Once dissolved, 0.36 of ethyl vinyl ether and 0.41 g of 2-(3-butenyl)-18-crown-6 were added and the reaction mixture was mixed well. 2.4 g of macroporous (450 m$^2$/g, 55% cross-linked) polymeric resin was then added to the reaction mixture, the resin was dispersed well and then 0.06 g of Vazo 52 was added. The mixture was sonicated for approximately 5 minutes and then placed in an oven to tumble at 52° C. for approximately 6 hours. The reaction mixture was then removed from the oven, filtered in a Buchner funnel and washed with alternate aliquots of boiling water and acetone for at least 3 washing cycles. The resin was left to sit in 200 mL of 0.5M NaOH and then washed consecutively with water and 1M HCl.

The above bifunctional resin was packed into a chromatography column (4×250 mm) and employed to separate a mixture of lithium, sodium, ammonium, potassium, magnesium and calcium cations in 2.2 mN sulfuric acid as described in Example 8 above except that at 29 minutes the eluent was changed from 22 mN sulfuric acid to 13 mN sulfuric acid. The separation profile obtained is shown in FIG. 5.

Figure 5:
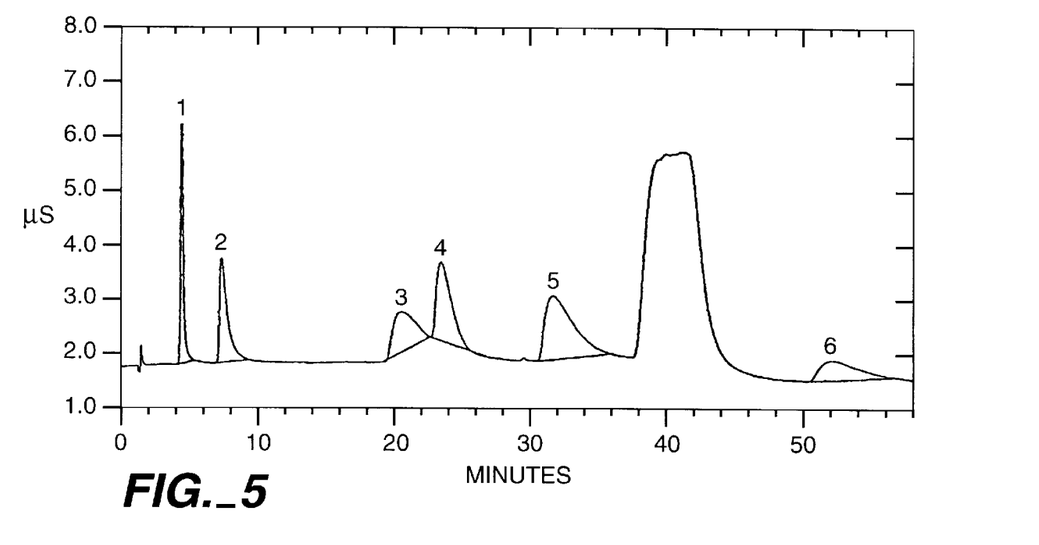
FIG. 5. Elution profile of various cations on a bifunctional cation-exchange column of the present invention. Presented is the elution profile of a mixture of lithium, sodium, ammonium, potassium, magnesium and calcium ions from a bifunctional cation-exchange chromatography column of the present invention. The peak numbers refer to the following cations: 1-lithium, 2-sodium, 3-ammonium, 4-magnesium, 5-calcium and 6-potassium.

As shown in FIG. 5, the bifunctional column was capable of separating the cations in a very efficient way. As compared to the cationic separation obtained with the standard column shown in FIG. 4, the bifunctional column provided a significantly better separation of sodium and ammonium. Moreover, the elution of potassium was significantly delayed, thereby causing potassium to elute last. The separation obtained, therefore, was significantly better than that obtained with the standard cation-exchange column shown in FIG. 4.

EXAMPLE 10

Grafting of crown ether functional groups onto a resin which already contains grafted carboxylate functional groups and a linker to provide a bifunctional compositions and use for cation separation.

2.4 g of the cation-exchange resin prepared in Example 8 above was dispersed in 19.3 g of propylene carbonate. Once dispersed, 0.41 g of 2(3-butenyl)-18-crown-6 was added and the reaction mixture was mixed well. 0.06 g of Vazo 52 was then added. The mixture was sonicated for approximately 5 minutes and then placed in an oven to tumble at 52° C. for approximately 6 hours. The reaction mixture was then removed from the oven, filtered in a Buchner funnel and washed with alternate aliquots of boiling water and acetone for at least 3 washing cycles. The resin was left to sit in 200 mL of 0.5M NaOH and then washed consecutively with water and 1M HCl.

The above bifunctional resin was packed into a chromatography column (4×250 mm) and employed to separate a mixture of lithium, sodium, ammonium, potassium, magnesium and calcium cations in 2.2 mN sulfuric acid as described in Example 8 above. The separation profile obtained is shown in FIG. 6.

Figure 6:
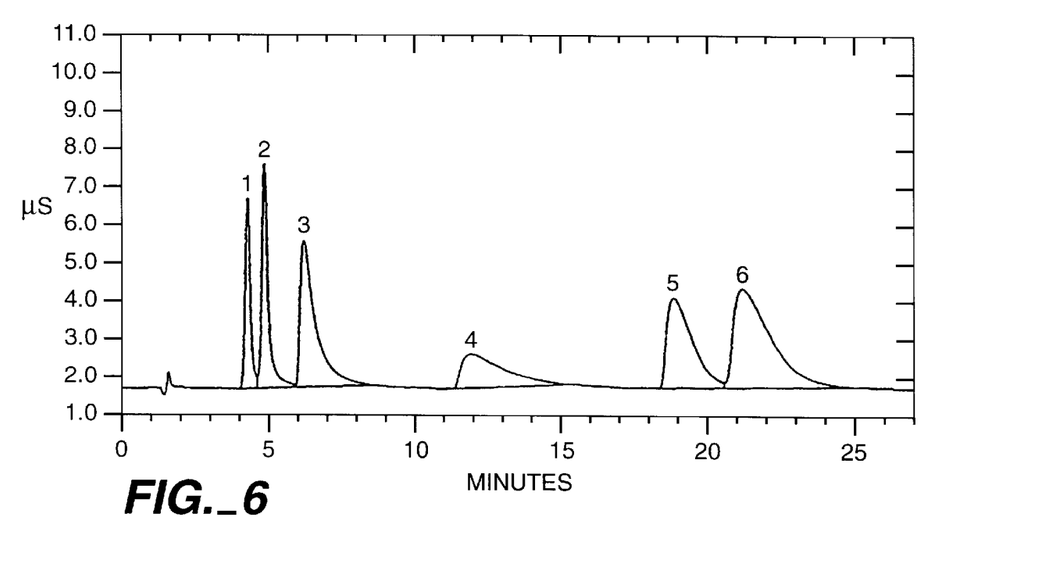
FIG. 6. Elution profile of various cations on a bifunctional cation-exchange column of the present invention. Presented is the elution profile of a mixture of lithium, sodium, ammonium, potassium, magnesium and calcium ions from a bifunctional cation-exchange chromatography column of the present invention. The peak numbers refer to the following cations: 1-lithium, 2-sodium, 3-ammonium, 4-potassium, 5-magnesium and 6-calcium.

As shown in FIG. 6, the bifunctional column was capable of separating the cations in a very efficient way. As compared to the cationic separation obtained with the standard cation-exchange column shown in FIG. 4, the bifunctional column provided a significantly better separation of sodium and ammonium. Moreover, the elution of potassium was significantly delayed, thereby causing potassium to elute well after both sodium and ammonium. The separation obtained, therefore, was significantly better than that obtained with the standard cation-exchange column shown in FIG. 4.

The foregoing description details specific methods which can be employed to practice the present invention. Having detailed such specific methods, those skilled in the art will well enough known how to devise alternative reliable methods at arriving at the same information in using the fruits of the present invention. Thus, however, detailed the foregoing may appear in text, it should not be construed as limiting the overall scope thereof; rather, the ambit of the present invention is to be determined only by the lawful construction of the appended claims. All documents cited herein are expressly incorporated by reference.

What is claimed is:

1. A bifunctional cation-exchange composition for use in cation-exchange chromatography comprising:
    (a) synthetic resin support particles;
    (b) crown ether functional groups attached to said synthetic resin support particles, wherein said crown ether functional groups are capable of forming complexes with at least one cation present in an eluent in contact therewith, thereby delaying the elution of said at least one cation from said bifunctional cation-exchange composition, and
    (c) non-crown ether cation-exchange functional groups attached to said synthetic resin support particles, wherein said non-crown ether cation-exchange functional groups are capable of interacting with cations present in said eluent.

2. The bifunctional cation-exchange composition according to claim 1, wherein said non-crown ether cation-exchange functional groups are selected from the group consisting of sulfonate groups, carboxylate groups, phosphonate groups or a mixture thereof.

3. The bifunctional cation-exchange composition according to claim 2, wherein said mixture is a mixture of carboxylate and phosphonate groups.

4. The bifunctional cation-exchange composition according to claim 2, wherein said non-crown ether cation-exchange functional groups are carboxylate groups.

5. The bifunctional cation-exchange composition according to claim 1 which comprises at least two different non-crown ether cation-exchange functional groups attached to said synthetic resin support particles.

6. The bifunctional cation-exchange composition according to claim 1, wherein said crown ether functional groups have a higher affinity for complexing with a single specific cation present in said eluent as compared to any other cation present in said eluent, said single specific cation being selected from the group consisting of $K^+$, $Na^+$, $Li^+$, $NH_4^+$, $Ca^{++}$, $Mg^{++}$, $Sr^{++}$ and $Ba^{++}$.

7. The bifunctional cation-exchange composition according to claim 6, wherein said single specific cation is $K^+$ cation.

8. The bifunctional cation-exchange composition according to claim 6, wherein said single specific cation is $Na^+$ cation.

9. The bifunctional cation-exchange composition according to claim 6, wherein said single specific cation is $Li^+$ cation.

10. The bifunctional cation-exchange composition according to claim 6, wherein said single specific cation is $NH_4^+$ cation.

11. The bifunctional cation-exchange composition according to claim 1 which comprises at least two different crown ether functional groups attached to said synthetic resin support particles.

12. The bifunctional cation-exchange composition according to claim 11, wherein said at least two different crown ether functional groups each exhibit a different affinity for complexation with at least one cation.

13. The bifunctional cation-exchange composition according to claim 1, wherein said crown ether functional groups are attached to said synthetic resin support particles through a linker chain of from about 1 to about 20 atoms in length.

14. The bifunctional cation-exchange composition according to claim 13, wherein each of said about 1 to about 20 atoms in said linker chain is selected from the group consisting of substituted or unsubstituted carbon, oxygen, nitrogen or sulfur atoms.

15. The bifunctional cation-exchange composition according to claim 14, wherein each of said about 1 to about 20 atoms in said linker chain are substituted or unsubstituted carbon atoms.

16. The bifunctional cation-exchange composition according to claim 15, wherein said carbon atoms are hydrogen saturated.

17. The bifunctional cation-exchange composition according to claim 13, wherein at least one of said about 1 to about 20 atoms in said linker chain is oxygen, nitrogen or sulfur.

18. The bifunctional cation-exchange composition according to claim 13, wherein at least one atom in said linker chain is substituted with a group selected from the group consisting of alkyl, alkoxyl, carboxy, carboxyalkyl, hydroxyalkyl or hydroxyl.

19. The bifunctional cation-exchange composition according to claim 1, wherein said crown ether functional groups are selected from the group consisting of 9-crown-3, 12-crown-4, 15-crown-5, 18-crown-6, 21-crown-7, 24-crown-8, 27-crown-9 and 30-crown-10.

20. The bifunctional cation-exchange composition according to claim 19, wherein said crown ether functional group is 18-crown-6.

21. A chromatography column for use in cation-exchange chromatography comprising the bifunctional cation-exchange composition according to claim 1.

* * * * *